United States Patent
Falk et al.

(10) Patent No.: US 9,544,298 B2
(45) Date of Patent: Jan. 10, 2017

(54) METHOD FOR CERTIFICATE-BASED AUTHENTICATION

(75) Inventors: Rainer Falk, Poing (DE); Steffen Fries, Baldham (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 218 days.

(21) Appl. No.: 13/821,511

(22) PCT Filed: Jul. 22, 2011

(86) PCT No.: PCT/EP2011/062642
§ 371 (c)(1),
(2), (4) Date: Mar. 7, 2013

(87) PCT Pub. No.: WO2012/031820
PCT Pub. Date: Mar. 15, 2012

(65) Prior Publication Data
US 2013/0173922 A1    Jul. 4, 2013

(30) Foreign Application Priority Data
Sep. 7, 2010  (DE) .................. 10 2010 044 518

(51) Int. Cl.
*H04L 29/06*  (2006.01)
*H04L 9/32*   (2006.01)
(Continued)

(52) U.S. Cl.
CPC ........... *H04L 63/0823* (2013.01); *G06F 21/33* (2013.01); *H04L 9/3263* (2013.01); *H04W 12/06* (2013.01)

(58) Field of Classification Search
CPC .... H04L 9/3263; H04L 9/3265; H04L 9/3268; H04L 29/06755; H04L 29/06775; H04L 63/0823; H04L 2209/64; H04L 9/3271; H04L 9/3273
(Continued)

(56) References Cited

U.S. PATENT DOCUMENTS 6,202,157 B1 *  3/2001  Brownlie ................ G06F 21/33
                                                709/229
6,353,886 B1 *  3/2002  Howard et al. ................ 713/156
(Continued)

FOREIGN PATENT DOCUMENTS

CN    101076033       11/2007
CN    101094060 A     12/2007
(Continued)

OTHER PUBLICATIONS

Office Action for German Patent Application 10 2010 044 518.5-31; dated Apr. 11, 2011.
(Continued)

*Primary Examiner* — Darren B Schwartz
(74) *Attorney, Agent, or Firm* — Slayden Grubert Beard PLLC (57) ABSTRACT

A first subscriber authenticates himself to a second subscriber with a certificate associated to the first subscriber. The certificate specifies one or several characteristics, which have to be fulfilled by the second subscriber. In the course of the authentication, it is verified using the certificate whether the second subscriber fulfills the characteristics, wherein a criterion required for successful authentication is that the second subscriber fulfills the characteristics(s). Characteristics of the second subscriber are verified in the framework of the authentication process, the second subscriber representing the authenticator with respect to whom the authentication is carried out. In this way, certificates for authentication dedicated communication links between two
(Continued)

communication partners can be determined. The method can be used for any subscribers in a communication network, e.g., representing components of an automation system, such as, for example, control devices, field devices, sensors, actuators and the like.

17 Claims, 3 Drawing Sheets

(51) Int. Cl.
*G06F 21/33* (2013.01)
*H04W 12/06* (2009.01)

(58) Field of Classification Search
USPC 713/150, 155–157, 168–170, 175; 726/2–10
See application file for complete search history.

(56) References Cited

U.S. PATENT DOCUMENTS

| | | | |
|---|---|---|---|
| 2002/0026576 A1* | 2/2002 | Das-Purkayastha | G06F 21/552 713/156 |
| 2002/0093915 A1* | 7/2002 | Larson | 370/235 |
| 2002/0144109 A1* | 10/2002 | Benantar et al. | 713/156 |
| 2002/0144119 A1* | 10/2002 | Benantar | 713/171 |
| 2003/0140225 A1* | 7/2003 | Banks et al. | 713/155 |
| 2003/0204720 A1* | 10/2003 | Schoen et al. | 713/153 |
| 2004/0039911 A1* | 2/2004 | Oka | G06Q 30/06 713/175 |
| 2004/0088542 A1* | 5/2004 | Daude et al. | 713/156 |
| 2004/0225574 A1 | 11/2004 | Arnold et al. | |
| 2005/0086514 A1* | 4/2005 | Han | H04L 63/0823 726/26 |
| 2005/0154877 A1* | 7/2005 | Trench | 713/156 |
| 2005/0228886 A1* | 10/2005 | Cain et al. | 709/226 |
| 2006/0075222 A1* | 4/2006 | Moloney | H04L 63/0823 713/156 |
| 2006/0095760 A1* | 5/2006 | Benantar | G06F 21/33 713/156 |
| 2006/0168443 A1* | 7/2006 | Miller | H04L 12/58 713/156 |
| 2006/0294366 A1* | 12/2006 | Nadalin | H04L 63/061 713/156 |
| 2007/0289001 A1 | 12/2007 | Havercan | |
| 2008/0065883 A1 | 3/2008 | Zeng et al. | |
| 2008/0155260 A1* | 6/2008 | Perez | H04L 9/0869 713/169 |
| 2008/0301438 A1* | 12/2008 | Parkinson | H04L 9/3218 713/156 |
| 2009/0210703 A1* | 8/2009 | Epstein et al. | 713/157 |
| 2010/0005290 A1* | 1/2010 | Urien | H04L 9/3263 713/155 |
| 2011/0113481 A1* | 5/2011 | Panasyuk et al. | 726/10 |
| 2011/0161659 A1* | 6/2011 | Himawan | G06F 21/33 713/156 |

FOREIGN PATENT DOCUMENTS

| | | |
|---|---|---|
| CN | 101442411 A | 5/2009 |
| DE | 102010044518.5 | 9/2010 |
| EP | 0 456 386 A2 | 11/1991 |
| EP | 1 475 937 A2 | 11/2004 |
| EP | 1 653 387 A1 | 5/2006 |
| WO | 00/10303 | 2/2000 |

OTHER PUBLICATIONS

International Search Report for PCT/EP2011/062642; mailed Oct. 10, 2011.
English Abstracts of "Verordnung zur elektronischen Signaturen (Signaturverordnung—SigV)", Nov. 2001, obtained from www.gesetze-im-internet.de/bundesrecht/sigv_2001/gesamt.pdf and "Gesetz über Rahmenbedingungen für elektronische Signaturen (Signaturgesetz—SigG)"; May 2001, obtained from www.gesetze-im-internet.de/bundesrecht/sigg_2001/gesamt.pdf.
Chinese Office Action dated Nov. 15, 2014 in corresponding Chinese Patent Application No. 201180043122.3.
Office Action dated Jul. 29, 2015 in corresponding Chinese Patent Application No. 201180043122.3.
Supplementary Search Report for Chinese Patent Application No. 201180043122.3 (accompanying Jul. 29, 2015 Office Action).
Partial German translation of Jul. 29, 2015 Office Action in Chinese Patent Application No. 201180043122.3.

* cited by examiner

METHOD FOR CERTIFICATE-BASED AUTHENTICATION

CROSS REFERENCE TO RELATED APPLICATIONS

This application is the U.S. national stage of International Application No. PCT/EP2011/062642, filed Jul. 22, 2011 and claims the benefit thereof. The International Application claims the benefit of German Application No. 102010044518.5 filed on Sep. 7, 2010, both applications are incorporated by reference herein in their entirety.

BACKGROUND

Described below is a method for certificate-based authentication in which a first subscriber authenticates itself to a second subscriber with the aid of a digital certificate assigned to the first subscriber.

Digital certificates are well known. They contain the identity of an entity in the form of a person or institution or machine for which the certificate has been issued. Here and in the following, the concept of a subscriber to which a certificate can be assigned is used. In this context, a subscriber can be a computer or a machine for which the certificate has been issued. A subscriber can also refer to a computer or a machine which manages the certificate for a person or institution. The certificate is assigned to the computer or the machine by the responsibility for the certificate management.

A certificate contains a public key for the corresponding entity and the owner of the certificate can be confirmed by a digital signature in the certificate. In this context, the digital signature is calculated by a certificate authority. A root certificate from this authority or a certificate chain to the root certificate can be used to verify the signature as valid. A digital certificate can contain additional encrypted information in the form of so-called attributes which can be used to define authorizations for the user of the certificate or restrictions on the use of the certificate. For example, it is known, how to use an attribute to restrict the certificate or the cryptographic key confirmed by the certificate to certain types of communications or communication protocols only. It is also known how to restrict the geographic validity of a certificate so that, in the course of an authentication, the certificate can only be used by subscribers in a predetermined geographical area.

Also known is how to encrypt WLAN network names in a certificate as certificate extensions in order in this way to select a suitable certificate from a plurality of certificates held by the subscriber which is authenticating itself.

In addition, the encryption of authorization information is described in certificates. This authorization information is used to define the accesses that may be effected by the subscriber authenticated by the certificate. It is also known how to encrypt role information in certificates in order to simplify the administration of authorized accesses to a plurality of subscribers. In this context, a subscriber is granted or refused access to another subscriber in dependence on the role stored in the certificate.

Although known certificate extensions permit a restriction of the use of the certificate, they do not permit the definition of dedicated communication connections between two communication partners which are to have exclusive use of the certificate.

SUMMARY

Therefore, a method for certificate-based authentication is described below in which the use of the certificate can be precisely defined for predetermined communication tasks.

During the course of the method, authentication is performed in which a first subscriber authenticates itself to a second subscriber with the aid of a digital certificate assigned to the first subscriber. In this context, the certificate specifies one or more characteristics, which have to be fulfilled by the second subscriber. In this context, the concept of the specification of one or more characteristics in the certificate should be interpreted broadly. The specified characteristics can be stored directly in the certificate. It is also possible for the certificate to contain a reference to corresponding characteristics which are stored in a different place. This achieves an indirect specification of the characteristics in the certificate.

In the course of the authentication described below, it is verified with reference to the certificate whether the second subscriber fulfills the characteristic or characteristics, wherein a criterion required for a successful authentication is that the second subscriber fulfills the characteristic or characteristics. According to the method, during the authentication account is taken of properties of the second subscriber, which during the authentication represents the authenticator to which the first subscriber (i.e. the authenticatee) authenticates itself. This enables the use of the certificate to be dedicatedly restricted to specific communication connections between a first and a second subscriber.

As mentioned above, the characteristics specified by the certificate can be directly or indirectly (for example by a reference) coded in the certificate. In an embodiment, the characteristics are specified similarly to in the related art by one or more attributes, which contain the corresponding characteristics directly and/or one or more references to attributes via which the characteristics are specified indirectly. Unlike known attributes, these attributes now contain characteristics or properties of the second subscriber. Optionally, it is also possible for further attributes which are known per se to be specified in the certificate, which, in addition to the characteristics of the second subscriber to be fulfilled, define further restrictions to be taken into account during authentication.

In an embodiment of the method, the verification as to whether the second subscriber fulfills the characteristic or characteristics is performed by the second subscriber itself. In this context, the first subscriber transmits its certificate to the second subscriber or the second subscriber retrieves the certificate from a third place, for example from a corresponding certificate authority or a directory service. In this way, the second subscriber obtains access to the characteristics that it is to fulfill so that it is able to verify can whether it fulfills these characteristics. If it does not fulfill these characteristics, the authentication of the first subscriber is aborted or rejected.

In a further embodiment of the method, the verification as to whether the second subscriber fulfills the characteristic or characteristics is performed by the first subscriber. In this case, the characteristics to be correspondingly fulfilled do not need to be transmitted or provided to the second subscriber. In this context, corresponding properties of the second subscriber which can be used to verify whether the characteristics specified in the certificate are fulfilled can be stored in advance in the first subscriber. There is also a possibility that the first subscriber receives information relating to properties of the second subscriber from the second subscriber or retrieves the information from a third place (for example a certificate authority or a directory service) so that the first subscriber can then determine from the information whether the second subscriber fulfills the characteristic or characteristics specified in the certificate. If the characteristics are not fulfilled, the authentication can again be aborted in a suitable way, for example the first subscriber can refuse to transmit the certificate to the second subscriber or terminate the authentication at a later time.

The characteristics, which have to be fulfilled by the second subscriber can relate to any properties of the second subscriber. The characteristics can comprise one or more the following characteristics:

an identity or an identity range for the second subscriber;
a device type of the second subscriber;
a service provided by the second subscriber;
a method provided by the second subscriber.

In this context, the above concept of the device type should be interpreted broadly and can relate to one or more predetermined devices by which the functions of the second subscriber are implemented, optionally also to the devices of a specific device manufacturer. The above identity or the above identity range can in this context include, for example, an address, in particular an IP address or MAC address, or a corresponding address range, in particular an IP address range or MAC address range. Similarly, the identity or the identity range can refer to a name, for example a DNS name, or a name range, in particular a DNS name range. The identity or the identity range can optionally also represent a port number or a port number range, for example based on the TCP and/or UDP protocol or a URL identifier or URL identifier range. For the specification of an identity range, it is in particular possible to use suitable wildcards or network masks known from the related art.

The aforementioned service, which can represent a characteristic to be fulfilled by the second subscriber, is, for example, a web service. Similarly, the aforementioned method, which is to be provided by the second subscriber, can represent a method of a web service.

In a further embodiment of the method, during the course of the authentication of the first subscriber to the second subscriber, in addition to the above verification as to whether the second subscriber fulfills the characteristic or characteristics specified in the certificate, a verification of the certificate also takes place. This verification can be performed in a way which is known per se by the verification of the signature of the certificate.

In a further embodiment of the method, a public key of the first subscriber contained in the certificate and the private key assigned to this public key is used to establish a cryptographically secure connection between the first and second subscribers, for example based on the SSL/TLS protocol and/or the IKE/IPsec protocol and/or the IKEv2/IPsec protocol. In the course of the establishment of this connection, the verification of the characteristic or characteristics to be fulfilled by the first subscriber can be performed. Optionally, it is also possible for the verification of these characteristics to be performed outside of the establishment of this connection in a separate authentication, for example after the establishment of the cryptographically secure connection.

In a further embodiment of the method, the certificate is an extended X.509 certificate, wherein the X.509 certificate is known per se from the related art. This extended certificate also specifies the characteristic or characteristics to be fulfilled by the second subscriber.

The method can optionally also be used for mutual authentication between the first and second subscribers. This means the first subscriber uses the method to authenticate itself to the second subscriber and, with a reversal of the roles of the first and second subscribers, similarly the second subscriber authenticates itself to the first subscriber.

The method can be used for any first or second subscribers in the form of computers or machines. In this context, the subscribers may represent components of an automation system, such as, for example, corresponding control devices, field devices, sensors, actuators and the like.

Also described below is a communication network with a first and a second subscriber, wherein during the operation of the communication network a certificate-based authentication can be performed according to the above-described method or one or more variants of the above-described method.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

The following explains authentication according to the method based on an extended X.509 certificate, which is used, for example, with an IKE/IPsec or an SSL/TLS authentication. In addition to other information, a known X.509 certificate contains in a way which is known per se a public key of a first subscriber which wishes to authenticate itself to a second subscriber. In the course of the authentication, this key is used for the encrypted exchange of a secret and for the generation of a session key for a cryptographically secure communication between the first subscriber and the second subscriber. In this context, the certificate is signed by a trustworthy certificate authority. For verification, the certificate is transmitted to the second subscriber, which then verifies the signature in a way which is known per se based on a root certificate of the certificate authority issuing the certificate or a certificate chain to the root certificate. Table 1 below shows the essential information in a known X.509 certificate.

TABLE 1

Certificate
certificateID: SerialNumber
issuedTo: Name
issuer: Name
validFrom: Time
validTo: Time
Public Key
Attributes
AttributeA

TABLE 1-continued

AttributeB
Signature

In the above table, the term "certificateID" designates an identity of the certificate, which is specified by the serial number "SerialNumber". The English term "issuedTo" identifies the subscriber for whom the certificate has been issued, the term "issuedTo" being followed by the name of the subscriber. The term "issuer" designates the issuer of the certificate, which is specified by a suitable name of the issuer. The terms "validFrom" and "validTo" specify the validity period of the certificate, wherein the term "validFrom" specifies a point in time "Time" at which the validity of the certificate starts or has started and the term "validTo" in turn specifies a point in time "Time" defining the expiration date of the certificate. Then, the certificate contains the public key "Public Key" of the subscriber.

The certificate can also contain a plurality of attributes, which are defined in the section "Attributes" of the certificate. For example, in this context an attribute AttributeA and an attribute AttributeB are specified. Such attributes can, for example, specify authorizations, which define which actions the subscriber to which the certificate belongs can perform. In particular, it is known in this context to encrypt a DNS name or an IP address in an attribute. This can specify the email address or server address of an SSL/TLS server for which the certificate is considered to be valid. This information relates to the subject, i.e. to the entity which authenticates itself by the certificate. The certificate also contains the above-described signature, which is designated by "Signature" and enables the verification of the certificate based on a root certificate or a certificate chain to the root certificate.

In the course of an authentication of a first subscriber to a second subscriber described in more detail below, in the embodiment described here, an extended X.509 certificate is used with the structure shown in Table 2 below.

TABLE 2

Certificate
certificateID: SerialNumber
issuedTo: Name
issuer: Name
validFrom: Time
validTo: Time
Public Key
Attributes
AttributeA
AttributeB
authorizedVerifier: verifier
Signature The structure of the certificate in Table 2 extensively corresponds to the certificate in Table 1 and hence the same components will not be explained again. Unlike the certificate in Table 1, the extended X.509 certificate now contains a further attribute, which is designated "authorizedVerifier". This attribute specifies the characteristics designated as "Verifier", which, unlike the case in the related art, do not relate to the first subscriber authenticating itself, but to the second subscriber functioning as the authenticator, which checks or verifies the certificate. In this context, different embodiments of characteristics that can be specified by the attribute "authorizedVerifier" are possible. In particular, the characteristics can refer to addresses or address ranges or names or port numbers or web services or methods of web services. The following gives examples of characteristics of this kind, their types being shown in parentheses after the characteristics:

18.5.13.8 (IP address), 18.5.13.1-18.5.13.10 (IP address range), 18.5.0.0/16 (IP address range);
vpn.siemens.com (DNS name), *.siemens.com (DNS name range);
m2m.siemens.com:4137 (DNS name and port number);
m2m.siemens.com/registerRemoteService.wsdl (a web service);
m2m.siemens.com/remoteService/setSensingRange (a method of a web service).

In the course of the certificate check, in this context, the characteristics of the attribute "authorizedVerifier" are verified and only if the second subscriber fulfills these characteristics is the authentication successful. In this context, the characteristics do not have to define a specific second subscriber precisely; they can also designate a group of second subscribers, as indicated above by corresponding address ranges or name ranges. In particular, there is also the possibility of using so-called wildcards, which are placeholders for any symbol sequences. Wildcards of this kind can be defined in a way which is known per se using the asterisk symbol "*". These wildcards can, for example, enable authentication to second subscribers in the form of machines in a subnet with one single certificate. In this context, possible entries are "139.23.10." or "139.23.10.0/24" as an IP address band or "*.siemens.de" as a server cluster. In this context "139.23.10.0/24" indicates that, in the comparison, only the upper 24 bits of the IP address, i.e. "139.23.10", have to match.

Figure 1:
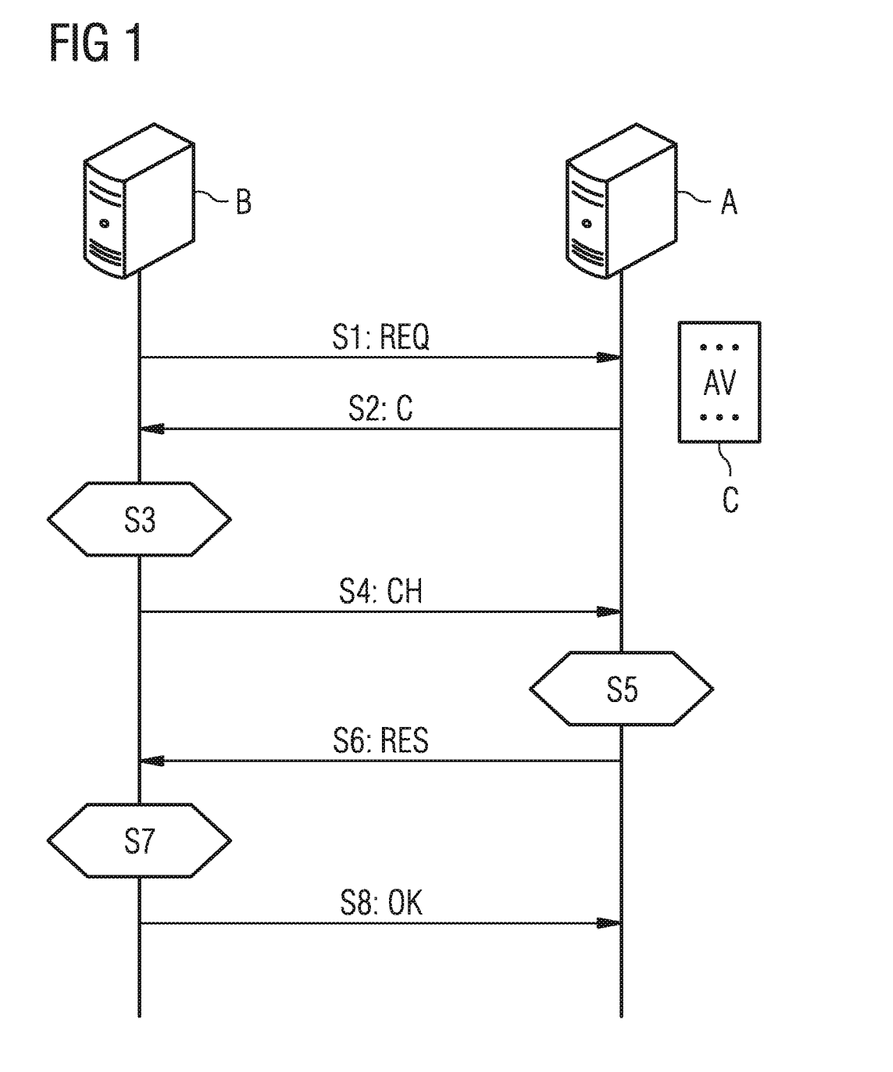
FIG. 1 is a flow diagram of an authentication according to a first embodiment.

The following describes a first embodiment of an authentication method with reference to FIG. 1, wherein, in this example, the verification as to whether the second subscriber fulfills the corresponding characteristics according to the attribute "authorizedVerifier" is performed by the first subscriber. In FIG. 1 and also in the subsequent FIGS. 2 and 3, in this context, the first subscriber functioning as an authenticatee is designated with reference character A and the second subscriber functioning as an authenticator is designated with reference character B, wherein these subscribers are depicted as corresponding computers, although they could also be depicted as any other types of machines or devices, for example components of an automation system.

In the embodiment in FIG. 1, in S1, the authenticator B requests the certificate by a request REQ from the authenticatee A. In S2, the authenticatee A transmits the certificate to the authenticator B, wherein the certificate is designated with reference character C and the attribute "authorizedVerifier" contained therein, with which the characteristics of the authenticator are specified is designated with reference character AV. The certificate transmitted in S2 is checked by the authenticator in S3. In this context, in addition to the checks known from the related art, which in particular include checking the signature of the certificate, it is also determined whether the authenticator fulfills the characteristics which are encrypted in the certificate C under the attribute AV. If it is determined in this context that the authenticator does not fulfill the characteristics, the authentication is aborted or rejected. If the certificate check according to S3 is successful, the authentication is continued within the framework of a challenge-response method which is known per se and in which, in S4, a challenge CH is transmitted from the authenticator B to the authenticatee A, wherein the challenge, for example, represents a random number generated by the authenticator. Then, in S5, a cryptographic operation is applied to the challenge with the private key of the authenticatee, wherein the corresponding public key to be used for the decryption is contained in the certificate C. In S6, the response RES, which results from the cryptographic operation, is transmitted to the authenticator B, which verifies this response based on the public key of the certificate in S7. If the verification is successful, i.e. if the original challenge CH can be reconstructed with the public key, the authentication process is successfully terminated, which is confirmed in S8 by a corresponding OK, which is transmitted from the authenticator to the authenticatee.

In the embodiment described with reference to FIG. 1, the authenticator B requests the certificate C from the authenticatee A separately. In an alternative embodiment, it is also possible for the authenticatee A to transmit the certificate C together with the response RES. Similarly, it is also possible for the authenticator to retrieve the certificate from a directory service or to have stored it locally on itself in advance.

Figure 2:
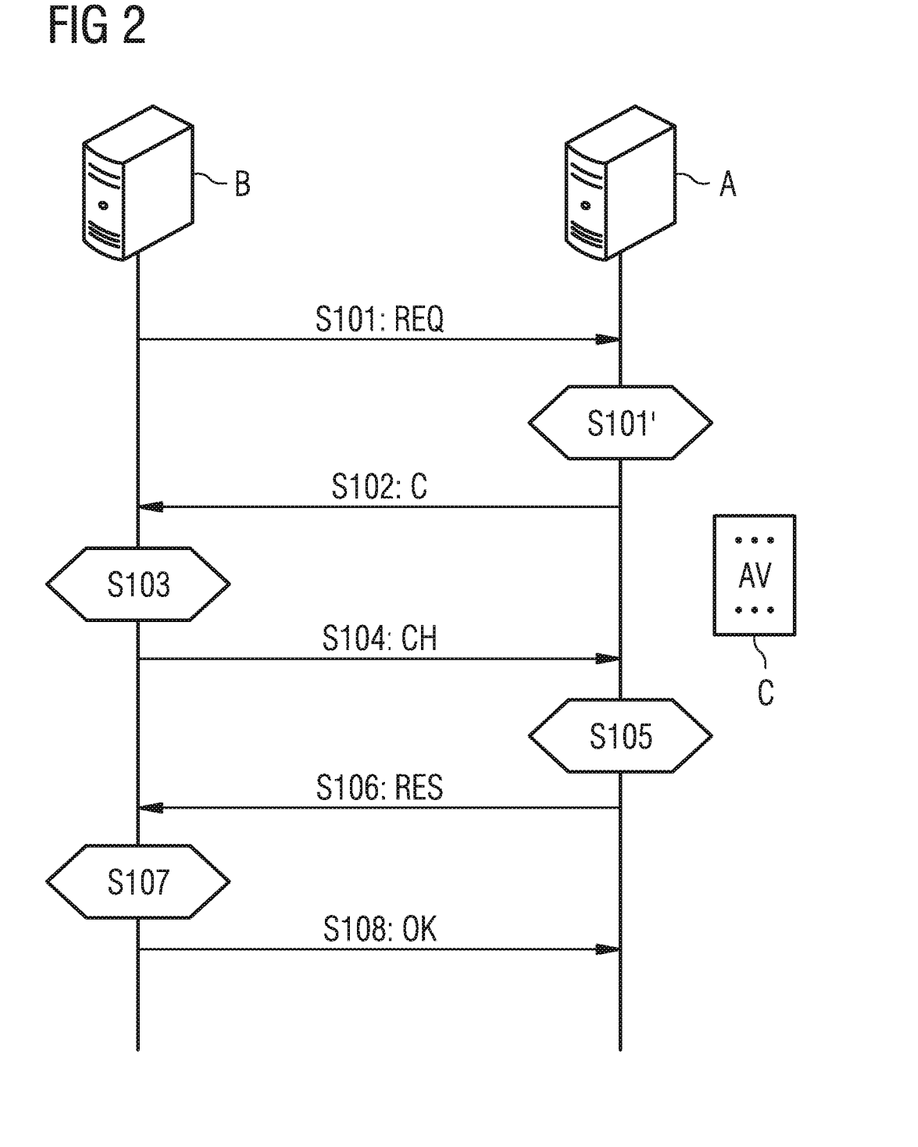
FIG. 2 is a flow diagram of an authentication according to a second embodiment.

FIG. 2 shows a modification of the authentication shown in FIG. 1. In this context, similarly to the case in FIG. 1, the certificate of the authenticatee A is designated with reference character C and the attribute "authorized Verifier" contained therein with reference character AV. Exactly as in the case in the embodiment in FIG. 1, in S101, the certificate is requested via a request REQ of the authenticator B from the authenticatee A. Unlike the method in FIG. 1, in S101', the authenticatee A now performs the verification as to whether the authenticator B requesting the certificate fulfills the characteristics according to the attribute AV. In this context, the actual characteristics of the authenticator are known to the authenticatee. These characteristics can be transmitted from the authenticator to the authenticatee by the above request REQ or optionally by a separate message. It is also possible for the authenticatee to retrieve the actual characteristics of the authenticator from a third place in which these characteristics are stored. If it is established that the characteristics according to the attribute AV are not fulfilled by the authenticator B, the authentication is aborted or rejected in suitable way, for example in that subsequently the certificate C is not provided to the authenticator or the response RES, which is described further below, is not calculated and transmitted.

If, on the other hand, it is identified in S101' that the authenticator B fulfills the characteristics according to the attribute AV of the certificate C, in S102, the certificate C is transmitted to the authenticator B. Then, in S103, the authenticator verifies the certificate in a way that is known per se, wherein it in particular checks the validity of the certificate and the signature of the certificate. In this context, unlike the case in FIG. 1, it no longer needs to verify the attribute AV since this has already been performed by the authenticator in S101'. If the verification of the certificate is successful, similarly to FIG. 1, a challenge-response method is performed in which, in S104, a challenge CH is transmitted to the authenticatee A, which then, in S105, executes a cryptographic operation on the challenge CH with its private key. The response RES resulting from the cryptographic operation is transmitted in S106 to the authenticator B, which, in S107, verifies the response based on the public key of the certificate C and, in the case of a successful verification, in S108, transmits an OK to the authenticator, by which the successful authentication is notified.

Figure 3:
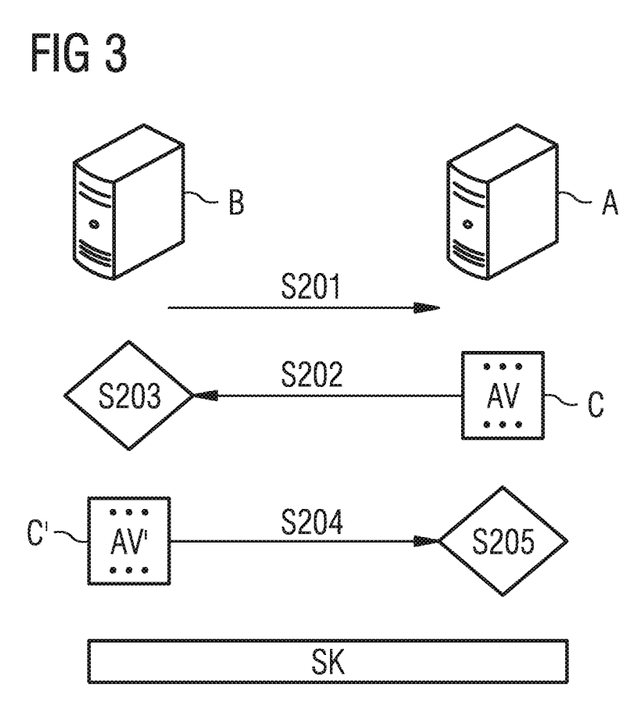
FIG. 3 is a flow diagram of a two-way authentication according to a third embodiment.

In the embodiments in FIG. 1 and FIG. 2, the authentication is depicted as an independent method. However, it is also optionally possible for the authentication to be performed in the course of the establishment of an authenticated connection based on known protocols, such as SSL, TLS, IKE, EAP-TLS and the like. In a further variant, it is also possible for two-way authentication of both subscriber A to subscriber B and subscriber B to subscriber A to take place. FIG. 3 depicts an embodiment of this kind of two-way authentication between subscribers B and A.

In FIG. 3, the information exchange takes place via the SSL/TLS protocol which is known per se. In this context, S201 to S205 below generally each include a plurality of partial steps, which are known per se from the SSL/TLS protocol and will therefore not be described in any further detail. In S201, subscriber B asks subscriber A for its certificate C with the characteristics or attributes AV contained therein. In S202, this certificate is transmitted, wherein, in S203, the verification of the certificate takes place. In the course of S203, subscriber B verifies whether it fulfills the characteristics AV contained in the certificate C. In S204, subscriber B transmits its certificate C' with the characteristics or attributes AV' contained therein to subscriber A. After reception of the certificate, subscriber A verifies in S205 whether it fulfills the characteristics AV'. If the verifications in S203 and S205 are both positive, both certificates will be considered to be valid by the corresponding subscribers and a corresponding authentication can take place during the course of which a session key SK is established between the two subscribers A and B. This key can then be used for confidentially-protected communication.

In the variant in FIG. 3, the verification of the corresponding characteristics AV or AV' takes place during the course of the execution of the protocol. As mentioned above, this verification can also take place in the course of an independent authentication outside the protocol between the authenticating communication partners, for example by the HTTP protocol following the completion of the establishment of a SSL/TLS connection via the established SSL/TLS connection.

The above-described embodiments of the method have a series of advantages. In particular, it is possible for certificates to be issued which can only be used for precisely one defined purpose, for example for secure communication with a bootstrapping server or for secure communication with only one specific VPN server. The authentication method enables possible damage to a compromised certificate or a key confirmed by the certificate to be controlled since the certificate is not universally applicable but can only be used for a quite precisely restricted application. Optionally, it is also possible to use free certificates, which are issued inexpensively with low administrative checks, and which for example only function between devices made by one manufacturer. This can be achieved by the fact that in the corresponding attribute of the certificate only devices of a specific manufacturer are named as authenticators.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for certificate-based authentication in which a first subscriber provides self-authentication to a second subscriber using a certificate assigned to the first subscriber, comprising:

transmitting, by a first computer system of the first subscriber, the certificate of the first subscriber that (a)

specifies at least one characteristic which must be fulfilled by the second subscriber to authenticate the second subscriber as an authenticated verifier and (b) contains a public key;

receiving, at a second computer system of the second subscriber, the certificate of the first subscriber;

accessing, by the second computer system of the second subscriber, the at least one characteristic specified in the certificate of the first subscriber;

verifying, by the second computer system of the second subscriber, whether the second subscriber fulfills the at least one characteristic specified in the certificate of the first subscriber to authenticate the second subscriber as the authenticated verifier; and only after a successful verification by the second subscriber that the second subscriber fulfills the at least one characteristic specified in the certificate of the first subscriber, performing a challenge-response exchange including:

sending, by the second computer system of the second subscriber, a challenge to the first subscriber;

generating a response to the challenge, by the first computer system of the first subscriber, based on a private key of the first subscriber, and sending the response to the second subscriber; and verifying, by the second computer system of the second subscriber, the response of the first subscriber using the public key contained in the certificate of the first subscriber.

2. The method as claimed in claim 1, wherein the at least one characteristic is specified by at least one attribute and/or at least one reference to an attribute in the certificate.

3. The method as claimed in claim 1, further comprising, prior to said verifying by the second subscriber, either:

transmitting, from the first subscriber to the second subscriber, the certificate of the first subscriber; or retrieving by the second subscriber the certificate of the first subscriber from a third place.

4. The method as claimed in claim 1, wherein the at least one characteristic which must be fulfilled by the second subscriber comprises at least one of an identity or an identity range for the second subscriber, a device type of the second subscriber, a service provided by the second subscriber, and a process provided by the second subscriber.

5. The method as claimed in claim 4, wherein the identity or the identity range comprises at least one of an internet protocol address or a media access control address, an internet protocol address range or a media access control address range, a domain name system name, a domain name system name range, a port number or a port number range based on a transport control protocol and/or a user datagram protocol, and a universal resource locator identifier or a universal resource locator identifier range.

6. The method as claimed in claim 4, wherein the service provided by the second subscriber includes a web service and/or the process provided by the second subscriber includes a web service.

7. The method as claimed in claim 1, further comprising establishing a cryptographically secure connection between the first and second subscriber based on at least one of a secure sockets layer/transport layer security protocol and an internet key exchange/internet protocol security protocol, using a public key of the first subscriber contained in the certificate and a private key assigned to the public key.

8. The method as claimed in claim 7, wherein the certificate is an extended X.509 certificate, which also specifies the at least on characteristic which must be fulfilled by the second subscriber.

9. The method as claimed in claim 8, wherein the first subscriber authentication by the second subscriber and second subscriber authentication performed by the first subscriber use a same procedure.

10. The method as claimed in claim 9, wherein at least one of the first and second subscriber is at least one component of an automation system.

11. A communication network, comprising:

at least one of a wired network and a wireless network; and first and second computer systems of first and second subscribers, respectively, communicating via the at least one of the wired network and the wireless network, performing certificate-based authentication of the second subscriber as an authenticated verifier for the first subscriber, wherein:

the first computer system of the first subscriber is configured to transmit a certificate of the first subscriber that (a) specifies at least one characteristic which must be fulfilled by the second subscriber to authenticate the second subscriber as the authenticated verifier and (b) contains a public key; and the second computer system of the second subscriber is configured to:

receive the certificate of the first subscriber;

access the at least one characteristic specified in the certificate of the first subscriber;

verify whether the second subscriber fulfills the at least one characteristic specified in the certificate of the first subscriber to authenticate the second subscriber as the authenticated verifier; and the first and second computer systems of first and second subscribers are configured to, only after a successful verification by the second subscriber that the second subscriber fulfills the at least one characteristic specified in the certificate of the first subscriber, perform a challenge-response exchange including:

the second computer system of the second subscriber sending a challenge to the first subscriber;

the first computer system of the first subscriber generating a response to the challenge based on a private key of the first subscriber, and sending the response to the second subscriber; and the second computer system of the second subscriber verifying the response of the first subscriber using the public key contained in the certificate of the first subscriber.

12. The communication network as claimed in claim 11, wherein at least one of the first and second subscriber is at least one component of an automation system.

13. The communication network as claimed in claim 11, wherein the at least one characteristic is specified by at least one attribute and/or at least one reference to attribute in the digital certificate.

14. The communication network as claimed in claim 11, wherein the at least one characteristic which must be fulfilled by the second subscriber comprises at least one of an identity or an identity range for the second subscriber, a device type of the second subscriber, a service provided by the second subscriber, and a method provided by the second subscriber.

15. The communication network as claimed in claim 14, wherein the identity or the identity range comprises at least one of
- an internet protocol address or a media access control address,
- an internet protocol address range or a media access control address range,
- a domain name system name,
- a domain name system name range,
- a port number or a port number range based on a transport control protocol and/or a user datagram protocol, and
- a universal resource locator identifier or a universal resource locator identifier range.

16. The communication network as claimed in claim 14, wherein the service provided by the second subscriber includes a web service and/or the method provided by the second subscriber includes a web service.

17. A method for certificate-based authentication in which a first subscriber provides self-authentication to a second subscriber using a certificate assigned to the first subscriber, comprising:
- receiving, at a first computer system of the first subscriber, from a second computer system of the second subscriber, a request for the certificate of the first subscriber that (a) specifies at least one characteristic which must be fulfilled by the second subscriber to authenticate the second subscriber and (b) contains a public key;
- accessing, by the first computer system of the first subscriber, at least one actual characteristic of the second subscriber;
- determining, by the first computer system of the first subscriber, wherein the at least one actual characteristic of the second subscriber matches the at least one characteristic specified in the certificate of the first subscriber;
- in response to determining that the at least one actual characteristic of the second subscriber matches the at least one characteristic specified in the certificate of the first subscriber, sending the certificate from the first computer system of the first subscriber to the second computer system of the second subscriber;
- verifying, by the second computer system of the second subscriber, the received certificate of the first subscriber;
- after a successful verification, performing a challenge-response exchange including:
  - sending, by the second computer system of the second subscriber, a challenge to the first subscriber;
  - generating a response to the challenge, by the first computer system of the first subscriber, based on a private key of the first subscriber, and sending the response to the second subscriber; and
  - verifying, by the second computer system of the second subscriber, the response of the first subscriber using the public key contained in the certificate of the first subscriber.

* * * * *